(12) United States Patent
Larrew

(10) Patent No.: US 11,394,540 B1
(45) Date of Patent: Jul. 19, 2022

(54) MULTI AUTONOMOUS SECURE DOMAIN NAME SYSTEMS

(71) Applicant: UIPCO, LLC, San Antonio, TX (US)

(72) Inventor: Jason Paul Larrew, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 229 days.

(21) Appl. No.: 16/547,811

(22) Filed: Aug. 22, 2019

Related U.S. Application Data

(60) Provisional application No. 62/725,105, filed on Aug. 30, 2018.

(51) Int. Cl.
*H04L 29/06* (2006.01)
*H04L 9/08* (2006.01)
*H04L 9/30* (2006.01)

(52) U.S. Cl.
CPC ............. *H04L 9/088* (2013.01); *H04L 9/30* (2013.01)

(58) Field of Classification Search
CPC ....... H04L 9/088; H04L 9/30; H04L 61/1511; H04L 63/123; H04L 9/3247; H04L 61/302; H04L 63/12; H04L 9/006
See application file for complete search history.

(56) References Cited

U.S. PATENT DOCUMENTS

| | | | |
|---|---|---|---|
| 10,135,882 B1* | 11/2018 | Salour ................ | H04L 65/1069 |
| 2010/0070569 A1* | 3/2010 | Turakhia ........... | H04L 29/12066 709/203 |
| 2012/0017090 A1* | 1/2012 | Gould ..................... | H04L 63/12 713/176 |
| 2012/0117621 A1* | 5/2012 | Kondamuru ........ | H04L 61/1511 726/3 |
| 2012/0278626 A1* | 11/2012 | Smith .................. | H04L 63/123 713/176 |
| 2016/0330174 A1* | 11/2016 | Sullivan ............. | H04L 67/2819 |
| 2017/0012943 A1* | 1/2017 | Kaliski, Jr. ......... | H04L 63/0823 |

* cited by examiner

*Primary Examiner* — Yogesh Paliwal
(74) *Attorney, Agent, or Firm* — Perkins Coie LLP

(57) ABSTRACT

Embodiments disclosed herein allow multiple providers to answer for DNS while having DNSSEC enabled for the same zone. To do so, the system shares DNSKEY records between autonomous DNS vendors. Sharing DNSKEY records allows customers to use multiple DNS providers with DNSSEC enabled without sharing private keys amongst providers.

14 Claims, 6 Drawing Sheets

MULTI AUTONOMOUS SECURE DOMAIN NAME SYSTEMS

CROSS-REFERENCE TO RELATED APPLICATIONS

This application is a non-provisional of and claims priority to U.S. Provisional Application No. 62/725,105, filed on Aug. 30, 2018, entitled "MULTI AUTONOMOUS SECURE DOMAIN NAME SYSTEMS," which is hereby incorporated by reference in its entirety for all purposes.

BACKGROUND

Domain Name System (DNS) is an important part of Internet. When entering any website's address (e.g. www-.google.com), the address is converted into machine readable numbers (i.e. Internet Protocol (IP) Address (e.g. 64.383.372.190)). Thus, DNS converts the human-readable address into machine-readable IP Address. Unfortunately, DNS is not immune to attacks. Hackers have found weaknesses in DNS that allow attackers to create fake DNS records that can trick users to visit websites and download malicious files and software. Types of attacks include DNS Cache Poisoning and Spoofing, Dos, DDoS, IoT botnet DDos, DNS amplification, Fast-flux DNS, NXDOMAIN flood, Slow drip, TCP SYN flood, Domain brute Force, Reverse lookup, Zone Transfer, Zone walking. DNS Security Extension (DNSSEC) adds a layer of trust on top of DNS by providing authentication; that is, DNSSEC creates a secure domain name system by adding cryptographic signatures to existing DNS records using zones. While DNSSEC provides necessary security, enabling DNSSEC can cause issues when multiple vendors are enabled for the same zone.

Figure 1:
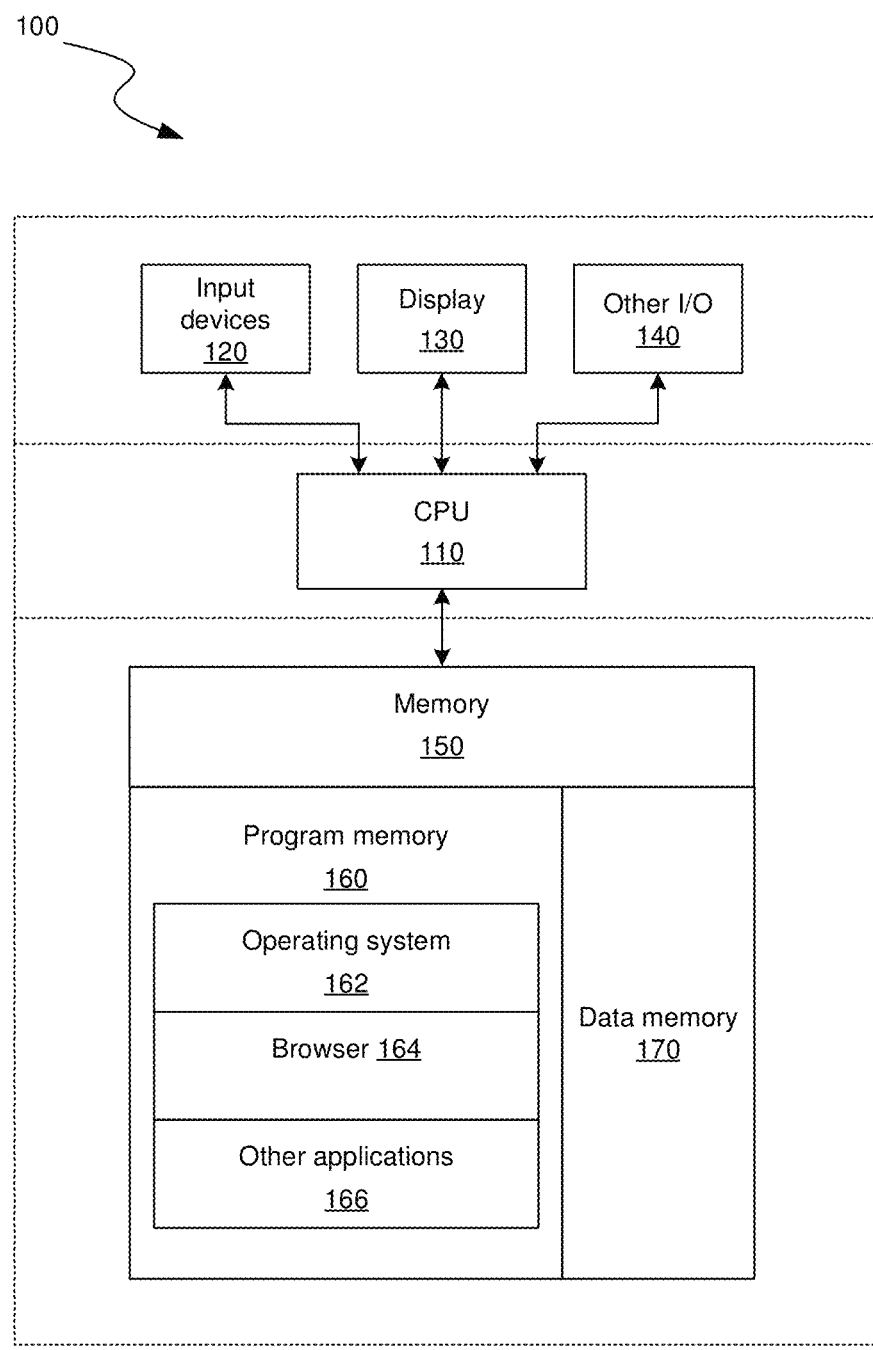
FIG. 1 is a block diagram illustrating an overview of devices on which some implementations can operate.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Embodiments disclosed herein allow multiple providers to answer for DNS while having DNSSEC enabled for the same zone. To do so, the system shares DNSKEY records between autonomous DNS servers. Sharing DNSKEY records allows customers to use multiple DNS providers with DNSSEC enabled without sharing private keys amongst providers.

DNSSEC protects the Internet community from forged DNS data by using public key cryptography to digitally sign authoritative zone data when received by the system and then validate it at its destination. Digital signing assures users that the data originated from the stated source and that it was not modified in transit. In DNSSEC, each zone has a public/private key pair and these cryptographic keys are used to sign records in a zone file. A DNS zone is any distinct, contiguous portion of the domain name space in the DNS for administrative responsibility has been delegated to a single manager. The zone's public key is published using DNS, while the zone's private key is kept safe and ideally stored offline. A zone's private key signs individual DNS data in that zone, creating digital signatures.

A DNSKEY record is a DNS Resource Record that contains a public key, among other information, that resolvers can use to verify DNSSEC signatures in RRSIG records. An RRSIG-record holds a DNSSEC signature for a record set (RRset record), which is a group of resource records that are of the same owner, class, and type. When an authoritative DNS server digitally signs a zone, it typically generates two key pairs, a zone-signing key (ZSK) pair and a key-signing key (KSK) pair. The DNS server uses the private key of the ZSK pair to sign each RRset in a zone. It stores the public key of the ZSK pair in a DNSKEY record. The DNS server then uses the private key of the KSK pair to sign the public ZSK, and stores the corresponding public KSK in another DNSKEY record. As a result, a zone typically has two DNSKEY records: a DNSKEY record that holds the public key of the ZSK pair, and another DNSKEY record that holds the public key of the KSK pair.

To allow transfer of trust from a parent zone (e.g., top level domain (TLD) such as .com, .org) to a child zone (e.g., www.example.com), a zone operator hashes the DNSKEY record containing the public KSK to generate a Delegation Signer (DS) record and provides this record to the parent. The DS record resides at the parent side of the delegation as part of a referral to establish trust to the child part of the delegation. That is, DS records check the validity of the child zone's public KSK by hashing it and comparing it to the DS record from the parent.

A TLD (top-level domain) is the highest level of domain names in the root zone of the DNS of the Internet maintained by the Internet Assigned Numbers Authority. Generic top-level domain (gTLD) is one of the categories of the top level domain (TLD) in the DNS (e.g., .com, .net, .org).

There are various types of records that can be used to map names to IP addresses. An "A record" maps a name to one or more IP addresses, when the IP are known and stable. A "CNAME record" maps a name to another name. However, the CNAME record should only be used when there are no other records on that name. An "ALIAS record" maps a name to another name, but it can coexist with other records on that name. In fact, the ALIAS record was created to provide CNAME-like behavior on apex domains. For example, if the domain is example.com and it is desired to point to a host name like myapp.akamai.com, then a CNAME record cannot be used but an ALIAS record can be used. When service providers are used, it is often necessary to use zone apex aliasing to overcome the limitations of CNAME records. Typically, the aliasing is provided by the vendor for zone apex records.

Often companies use vendors to handle DNS queries so that the entity does not have to provide IP addresses, preventing the company from distributed denial of servers (DDOS) attacks or other attacks. In doing so, zone apex aliasing is typically used, allowing the system to point a name (e.g., usaa.com) to another name (e.g., usaa.clearday.com). An apex record is a DNS record at the root (or apex) of a DNS zone. In many cases, the vendor is constantly changing their IP addresses for security so it would not be possible to point to a static IP address. Most, if not all, vendors use DNSSEC. Thus, when the company makes changes to their records, the vendor is required to sign the record changes with private keys so that users are directed to the correct IP address.

Many enterprises would like to use multiple DNS providers to distribute their authoritative DNS service for redundancy purposes. For example, if a company employs only one vendor to handle DNS queries and that vendor's system has an outage, the company will not be able to respond to any queries, which reflects poorly on the company. Due to DNSSEC (i.e., the need to keep private keys secured and secret) and the need for zone apex aliasing with the use of a vendor, employing more than one vendor without sharing private keys is difficult. The technology described herein allows for multiple providers to answer for DNS while having DNSSEC enabled. To do so, the system shares DNSKEY records between autonomous DNS servers. Sharing DNSKEY records allows customers to use multiple DNS providers with DNSSEC enabled and without having to provide private keys between vendors. Although extremely useful for multiple vendor situations, such technology can be deployed in other situations besides having two vendors.

In one embodiment, the company (or a vendor) controls a primary DNS server where administrative changes to records can be made. The primary DNS server may be a stealth primary DNS server in that it is not publicly accessible but authoritative for the secondary DNS servers. The primary DNS server is communicably coupled to two or more autonomous authoritative secondary DNS servers. The term "authoritative" refers to any DNS server that has a complete copy of the domain's information, whether it was entered by an administrator or transferred from a primary server. The term "autonomous" in this context means that multiple servers or providers can act independently on their own copy of the zone and are not required to interact with each other. When the controller of the primary DNS server changes the record, the changes are provided to each authoritative secondary DNS server. To capture these changes, each authoritative secondary DNS server signs the affected zone with its private ZSK, and generates a first DNSKEY record with the public ZSK. Each authoritative secondary DNS server also signs the public ZSK (which is stored in a DNSKEY record) with the private KSK and generates a second DNSKEY record with the public KSK. Because each authoritative secondary DNS server needs to match the other DNS servers so that requests are not rejected, the DNSKEY records created by the first authoritative secondary DNS server are provided to the second authoritative secondary DNS server and vice versa. If there are more than two authoritative secondary DNS servers, then each of the DNSKEY records from each of the authoritative secondary DNS servers exchange DNSKEY records. By doing this, requests routed to any of the secondary DNS servers can be filled.

The DNSKEY records can be manually copied from each secondary DNS server and provided to the other secondary DNS servers or APIs can automate this process. In some implementations, the owner of the zone is the entity responsible for the transfer of the DNSKEY records. However, if the various owners of the zones worked together, then the automation could be done within their platforms.

Each of the authoritative secondary DNS servers report record changes (e.g., changes to a domain) in a child zone to a parent zone, which is typically located in a TLD server. Each secondary DNS server hashes the DNSKEY record containing the public KSK to create a DS record. The DS records from each of the secondary DNS servers are provided to the TLD server.

In another implementation, instead of having one primary DNS server, there can be multiple authoritative primary DNS servers and no secondary servers. When there is a change to the record, then the change is propagated separately to each of the authoritative primary DNS servers. After making the change to the record, each primary DNS server provides the DNSKEY records to the other primary DNS servers. Next, each primary DNS server provides its DS record to the TLD DNS server.

This disclosure describes systems and processes designed to allow multiple DNS servers without sacrificing security. Various embodiments may provide one or more of the following technological improvements: (1) the ability to employ multiple DNS servers while DNSSEC is enabled without sharing private keys; (2) the ability to maintain an equivalent level of security while having redundant DNS servers; (3) the ability to have a stealth primary DNS server with multiple autonomous secondary DNS servers; and (4) the ability to have DNSSEC with multiple autonomous primary DNS servers.

In the following description, for the purposes of explanation, numerous specific details are set forth in order to provide a thorough understanding of embodiments of the present technology. It will be apparent, however, that embodiments of the present technology may be practiced without some of these specific details.

Suitable System

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that request internet webpages from various DNS servers. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display 130 is separate from the input device. Examples of display devices are: a LCD display screen; a LED display screen; a projected, holographic, or augmented reality display (such as a heads-up display device or a head-mounted device); and so on. Other I/O devices 140 can also be coupled to the processor, such as a network card, video card, audio card, USB, FireWire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory 150 includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 150 is not a propagating signal divorced from underlying hardware; a memory is thus non-transitory. A memory 150 can include program memory 160 that stores programs and software, such as an operating system 162, browser 164, and other application programs 166. A memory 150 can also include data memory 170 that can include a cache of internet websites the user accessed, user identifying information (e.g., addresses, usernames, passwords, personal identification numbers), historical information regarding use of an instance of an application, and other information which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
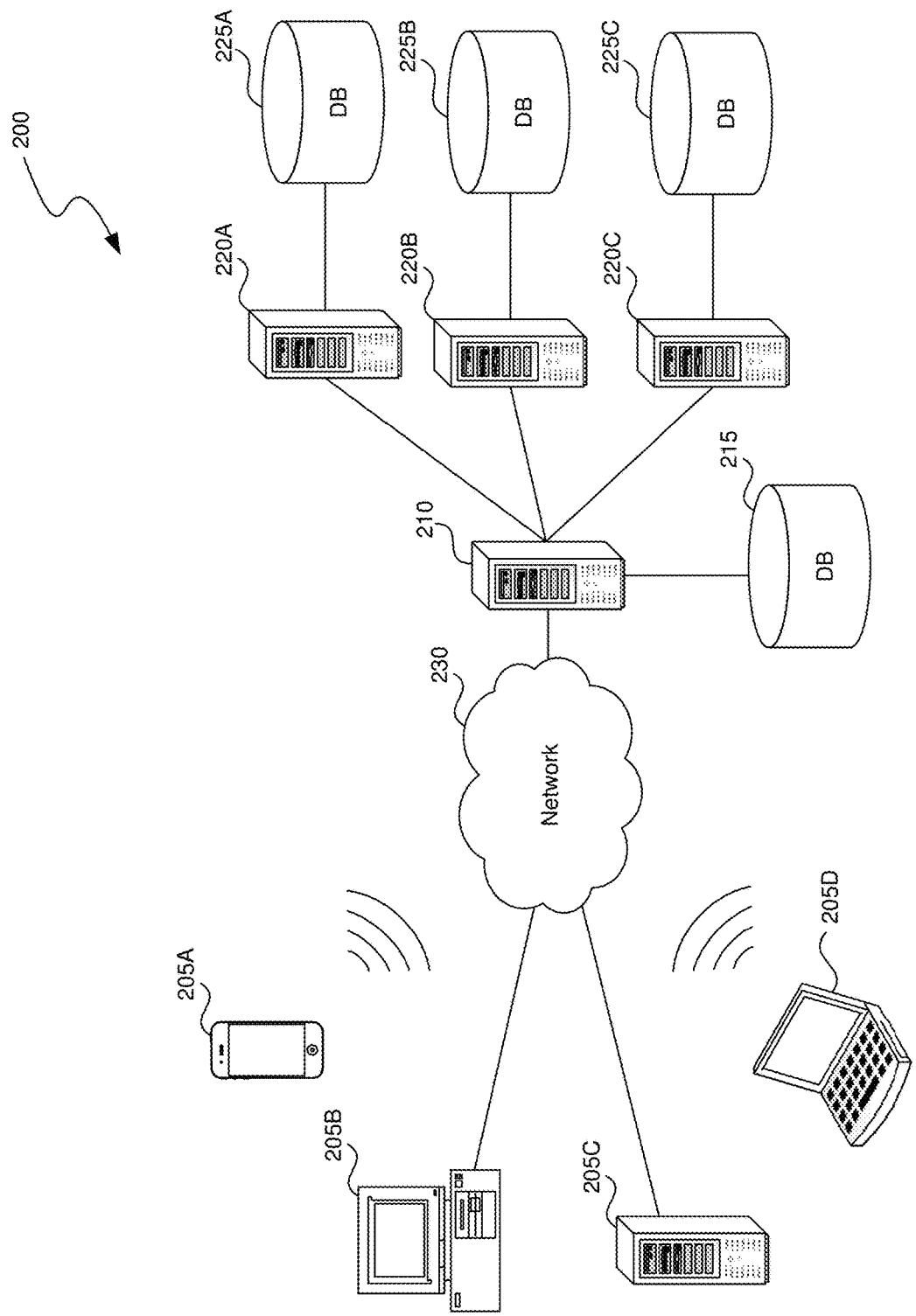
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210.

In some implementations, server computing device 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220A-C can each act as a server or client to other server/client devices. Server 210 can connect to a database 215. Servers 220A-C can each connect to a corresponding database 225A-C. As discussed above, each server 220A-C can correspond to a group of servers, and each of these servers can share a database or can have their own database. Databases 215 and 225 can warehouse (e.g., store) information such as unique identifiers assigned to devices associated with the user, whether application downloads have been verified as authorized by the system, transactions or other activity made via an application. Though databases 215 and 225A-C are displayed logically as single units, databases 215 and 225A-C can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205A-D can be connected to network 230 through a network interface, such as by wired or wireless communication. While the connections between server 210 and servers 220A-C are shown as separate connections, these connections can be any kind of local, wide area, wired, or wireless network, including network 230 or a separate public or private network.

Figure 3:
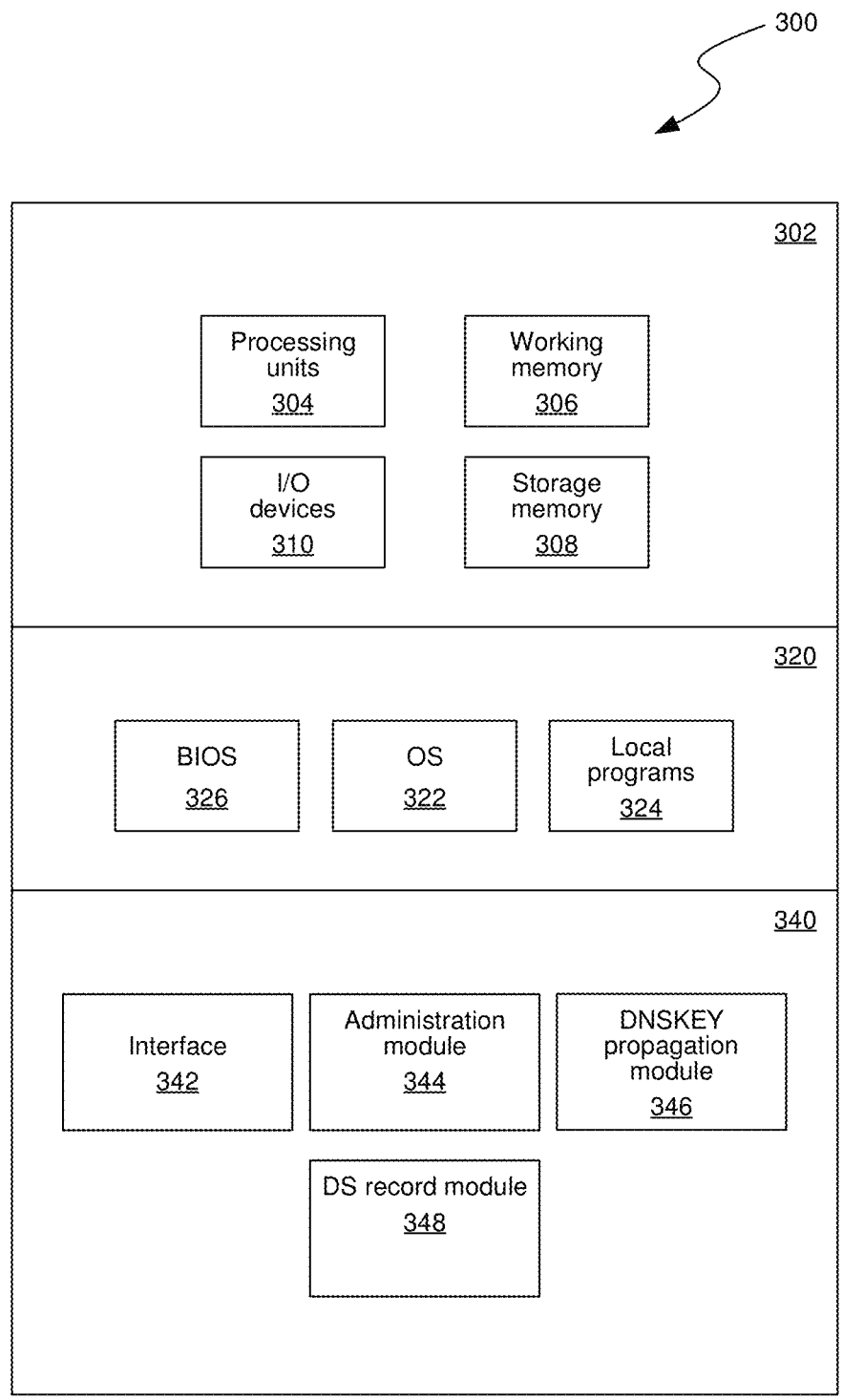
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308, and input and output devices 310. Components 300 can be implemented in a client computing device such as client computing devices 205 or on a server computing device, such as server computing device 210 or 220A-C. In some embodiments, some components of components 300 can be implemented in a client computing device while others are implemented on a server computing device.

General software 320 can include various applications, including an operating system 322, local programs 324, and a basic input output system (BIOS) 326. Specialized components 340 can be subcomponents of a general software application 320, such as local programs 324. Specialized components 340 can include administration module 344, DNSKEY propagation module 346, DS record module 348, and components that can be used for transferring data and controlling the specialized components, such as interface 342. In some implementations, components 300 can be in a computing system that is distributed across multiple computing devices or can be an interface to a server-based application executing one or more of specialized components 340.

Administration module 344 can make changes to a record (e.g., domain) in a zone and provide the changes to the authoritative secondary DNS servers (e.g., if there is a single primary DNS server). In some embodiments, the changes are made via a stealth primary DNS server such that the primary DNS server is not publicly available. In some embodiments, administrative module 344 can make changes to the records in each of the primary DNS servers separately if there is not a single primary DNS server making changes to the records. Once the changes have been sent to the various secondary DNS servers, each DNS server signs the affected zone with the change using a private ZSK and creates a first DNSKEY record that includes the public ZSK. Each secondary DNS server also signs the public ZSK with the private KSK and creates a second DNSKEY record that includes the public KSK. Thus, two separate DNSKEY records are created: one containing a ZSK public key and one containing a KSK public key. The public keys are used in other processes to verify the signatures.

DNSKEY propagation module 346 can send the DNSKEY records created from the change from each secondary (or primary) DNS server to the other DNS servers that made the same change so that each DNS server has copies of each DNS server's DNSKEY records. Even though the change to the record is the same, the DNSKEY records are different because each DNS server has different ZSK and KSK keys. Doing so allows all queries directed to any of the DNS servers to be filled because the credentials (i.e., signatures) of the domain can be checked using the DNSKEY records.

DS record module 348 can create DS records by hashing the DNSKEY record containing the KSK public key. DS record module 348 provides the DS records from each of the DNS servers to the parent zone (e.g., TLD) to publish as a DS record.

Figure 4:
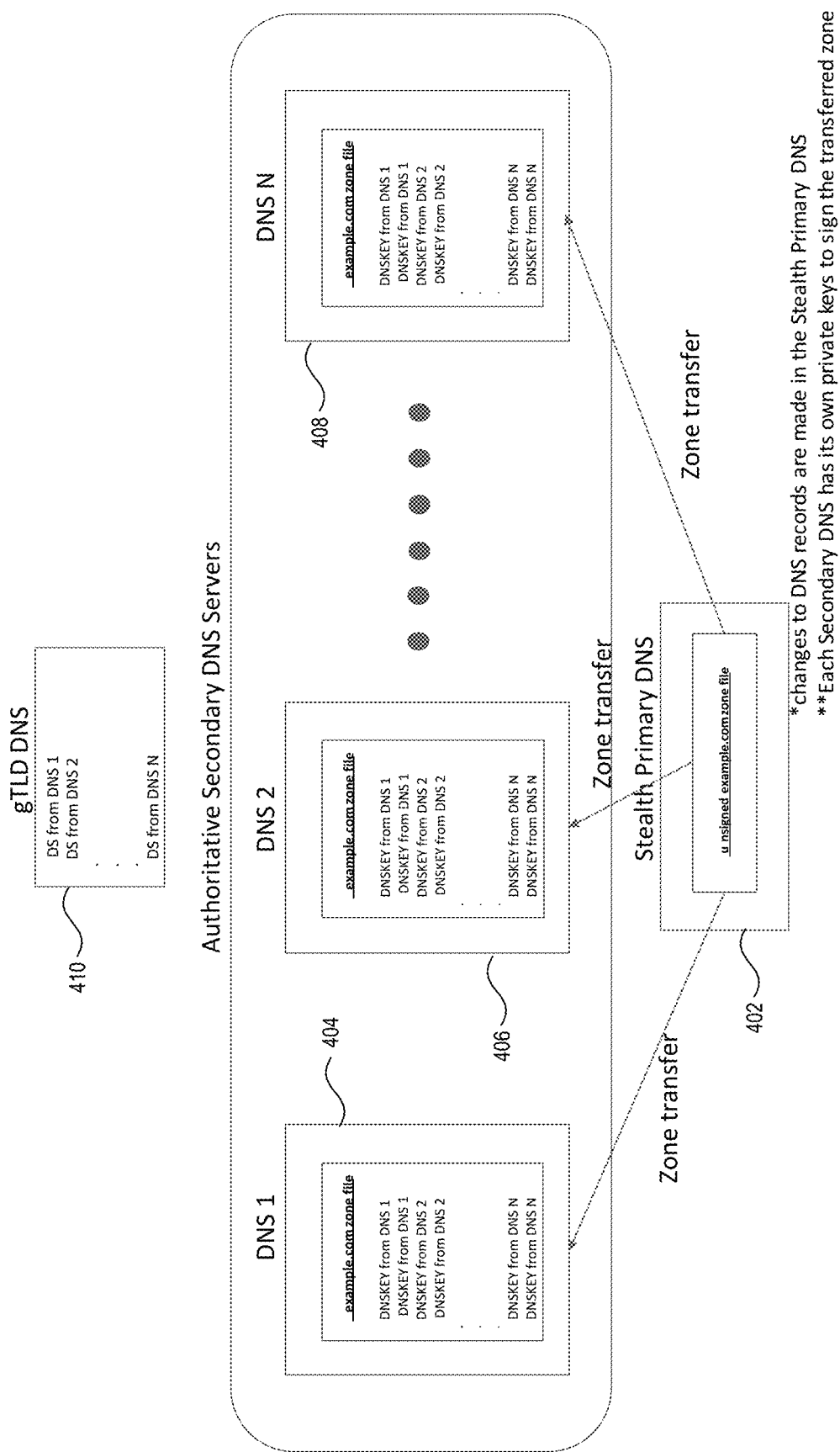
FIG. 4 is a block diagram illustrating DNSKEY propagation between multiple autonomous authoritative secondary DNS servers.

FIG. 4 is a block diagram illustrating DNSKEY propagation between multiple autonomous authoritative secondary DNS servers. As shown, a stealth primary DNS 402 can make changes to DNS records and these changes are propagated out to each secondary server DNS1-DNSN by zone transfers. DNS1 404 can change the record in the zone, sign the changed RRset record in the zone with its private ZSK to create a DNSKEY record with its public ZSK, sign the public ZSK with the private KSK and create another DNSKEY record with the public KSK. DNS2 406-DNSN 408 can take the same actions using their own private ZSKs and KSKs. Each of the DNS servers 404-408 can then share their DNSKEY records with one another so each secondary DNS server 404-408 has copies of each secondary DNS server's 404-408 DNSKEY records (e.g., DNS1 DNSKEY records are copied into DNS2 and DNSN and vice versa). To effect the record change, each secondary DNS server 404-408 hashes its own DNSKEY record containing the public KSK to create a DS record. Each DS record from each secondary DNS server 404-408 is provided to gTLD DNS 410.

Figure 5:
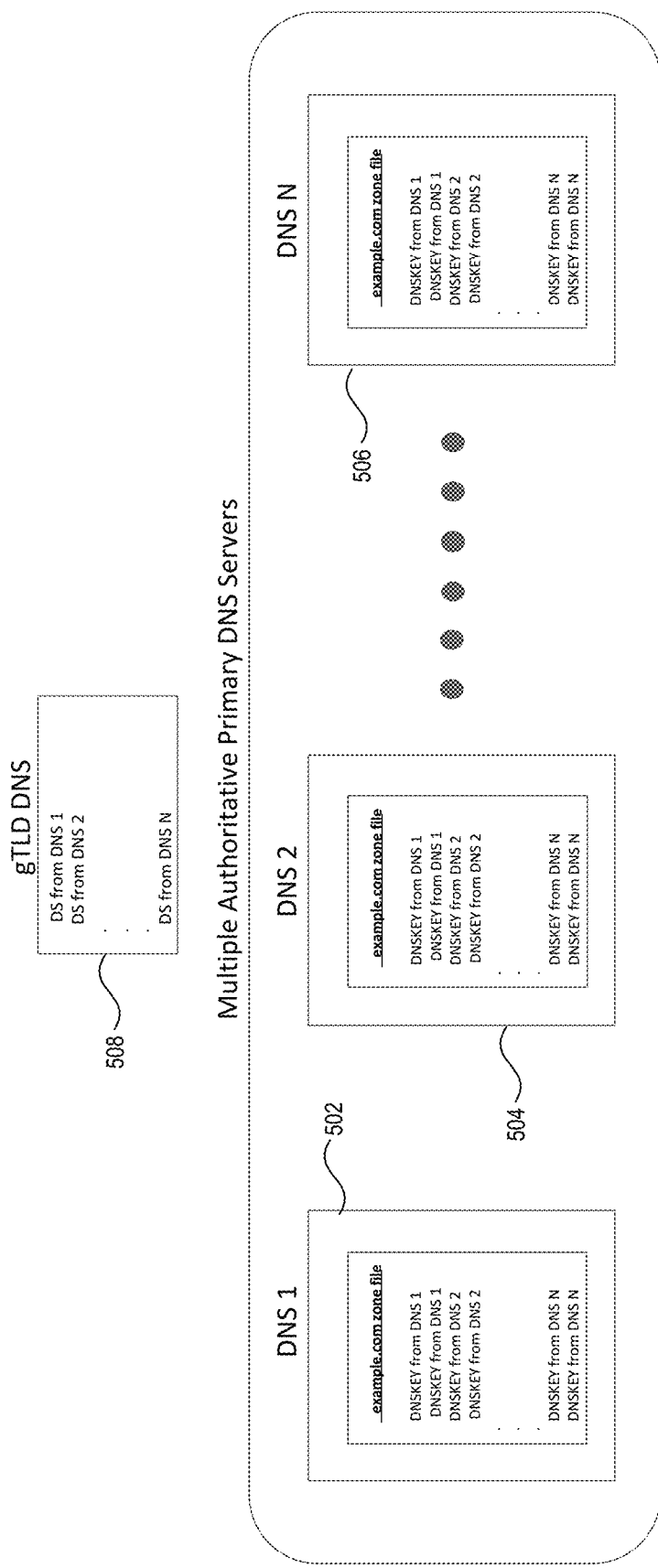
FIG. 5 is a block diagram illustrating DNSKEY propagation between multiple authoritative primary DNS servers.

FIG. 5 is a block diagram illustrating DNSKEY propagation between multiple authoritative primary DNS servers. DNS1 502, DNS2 504, and DNSN 506 are authoritative primary DNS servers. Changes to DNS records are made directly to each primary DNS server 502-506. After the record changes are communicated to each primary DNS server 502-506, each primary DNS server 502-506 creates the DNSKEY records and DS records as described above. The DNSKEY records are shared between DNS1 502, DNS2 504 and DNSN 506. In some embodiments, the primary DNS servers 502-506 send the DNSKEY records directly to each other. In other embodiments, the primary DNS servers 502-506 send the DNSKEY records to a central repository. Each primary DNS server 502-506 provides its DS record to gTLD DNS 508.

Those skilled in the art will appreciate that the components illustrated in FIGS. 1-3 described above, and in each of the flow diagrams discussed below, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Figure 6:
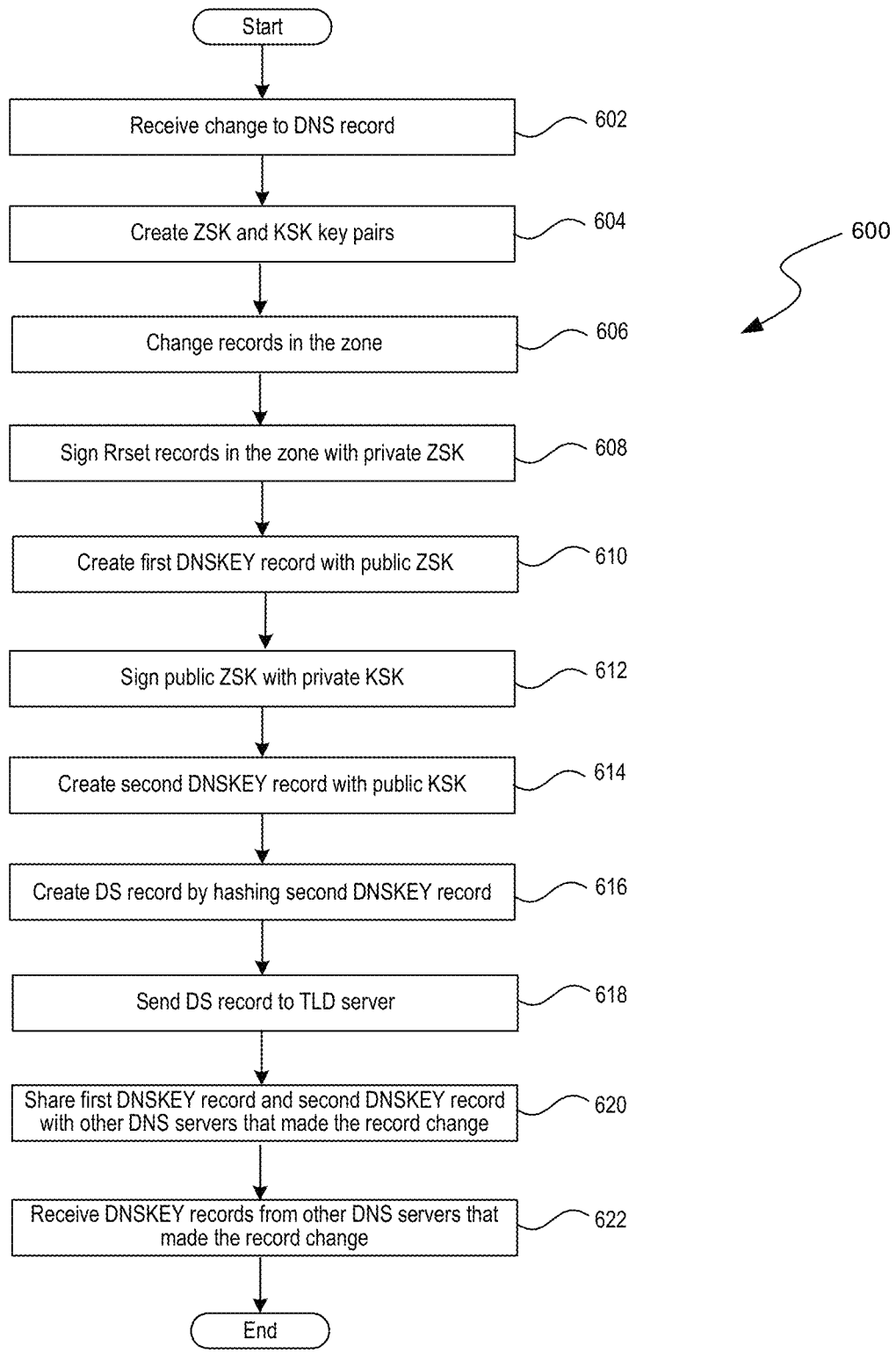
FIG. 6 is a flow diagram illustrating a process for enabling multiple DNS servers that use DNSSEC from the perspective of one of the DNS servers.

FIG. 6 is a flow diagram illustrating a process 600 for enabling multiple DNS servers that use DNSSEC from the perspective of one of the DNS servers. Receiving operation 602 receives changes to a DNS record. The changes can come from a primary DNS server or can come directly to the DNS server. Creating operation 604 creates ZSK and KSK key pairs. Changing operation 606 changes records in the zone affected by the changes. Signing operation 608 signs the RRset records in the zone with the private ZSK. Creating operation 610 creates a first DNSKEY record that includes the public ZSK. Signing operation 612 signs the public ZSK with a private KSK. Creating operation 614 creates a second DNSKEY record that includes the public KSK. Creating operation 616 creates a DS record by hashing the second DNSKEY record. Sending operation 618 sends the DS record to a TLD server. Sharing operation 620 shares the first DNSKEY record and the second DNSKEY record with other DNS servers that made the same record changes. Receiving operation 622 receives first and second DNSKEY records from the other DNS servers that made the same record changes, such that each DNS server has the same DNSKEY records.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communication links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A system comprising:
a primary Domain Name System (DNS) server comprising a processor and a memory;
a top level domain (TLD) server;
autonomous groups of authoritative secondary DNS servers, wherein each authoritative secondary DNS server autonomously operates in each group of authoritative secondary DNS servers, wherein a first group includes a first authoritative secondary DNS server and a second authoritative secondary DNS server;
  wherein after a change is made to a record in the primary DNS server, the change is propagated to the first authoritative secondary DNS server and the second authoritative secondary DNS server,
  wherein to propagate the change:
    the first authoritative secondary DNS server signs the change in a first zone with a first private key to validate the change,
    the first authoritative secondary DNS server generates, with a first public key, one or more first DNSKEY records that records the change,
    the second authoritative secondary DNS server signs the change in a second zone with a second private key to validate the change,
    the second authoritative secondary DNS server generates, with a second public key, one or more second DNSKEY records that records the change,
  wherein to ensure a DNSKEY record request routed to any authoritative secondary DNS servers autonomously operating in the first group is filled:
    the one or more second DNSKEY records and the one or more first DNSKEY records are exchanged between the first authoritative secondary DNS server and the second authoritative secondary DNS server.

2. The system of claim 1, wherein the one or more first DNSKEY records each include the first public key, wherein the one or more second DNSKEY records each include the second public key.

3. The system of claim 1, wherein the one or more first DNSKEY records include one of a public Zone Signing Key or a public Key Signing Key.

4. The system of claim 1, wherein the one or more first DNSKEY records comprises a first DNSKEY record signed with a public Zone Signing Key and another first DNSKEY record signed with a public Key Signing Key.

5. The system of claim 4, wherein the first authoritative secondary DNS server creates a Delegation Signer (DS) record by hashing the another first DNSKEY record signed with the public Key Signing Key.

6. The system of claim 5, wherein the DS record is sent to the TLD server.

7. The system of claim 1, wherein the primary DNS server is not publicly accessible, wherein the primary DNS server is authoritative for the first authoritative secondary DNS server and the second authoritative secondary DNS server.

8. A method comprising:
   effecting, by a primary Domain Name System (DNS) server, a change to a record;
   propagating the change to autonomous groups of authoritative secondary DNS servers, wherein each authoritative secondary DNS server autonomously operates in each group of authoritative secondary DNS servers, wherein a first group includes a first authoritative secondary DNS server and a second authoritative secondary DNS server,
   wherein to propagate the change:
      the first authoritative secondary DNS server signs the change in a first zone with a first private key to validate the change,
      the first authoritative secondary DNS server generates, with a first public key, one or more first DNSKEY records that records the changed record,
      second authoritative secondary DNS server signs the change in a second zone with a second private key to validate the change,
      the second authoritative secondary DNS server generates, with a second public key, one or more second DNSKEY records that records the change;
   exchanging the one or more first DNSKEY records and the one or more second DNSKEY records between the first authoritative secondary DNS server and the second authoritative secondary DNS server.

9. The method of claim 8, wherein the one or more first DNSKEY records each include the first public key, wherein the one or more second DNSKEY records each include the second public key.

10. The method of claim 8, wherein the one or more first DNSKEY records include one of a public Zone Signing Key or a public Key Signing Key.

11. The method of claim 8, wherein the one or more first DNSKEY records comprises a first DNSKEY record signed with a public Zone Signing Key and another first DNSKEY record signed with a public Key Signing Key.

12. The method of claim 11, wherein the first authoritative secondary DNS server creates a Delegation Signer (DS) record by hashing the another first DNSKEY record signed with the public Key Signing Key.

13. The method of claim 12, wherein the DS record is sent to the TLD server.

14. The method of claim 8, wherein the primary DNS server is not publicly accessible, wherein the primary DNS server is authoritative for the first authoritative secondary DNS server and the second authoritative secondary DNS server.

* * * * *